United States Patent [19]
Coffield

[11] Patent Number: 5,354,361
[45] Date of Patent: Oct. 11, 1994

[54] ENERGY RECOVERING PRESSURE BALANCE SCHEME FOR A COMBINATION PRESSURE SWING ABSORBER WITH A BOOST COMPRESSOR

[75] Inventor: Kelly M. Coffield, Davenport, Iowa

[73] Assignee: Litton Industries, Inc., Beverly Hills, Calif.

[21] Appl. No.: 68,762

[22] Filed: May 28, 1993

[51] Int. Cl.⁵ .............................. B01D 53/04
[52] U.S. Cl. .................. 95/103; 95/130; 96/109; 96/130; 96/133
[58] Field of Search ............. 95/96, 103, 130; 96/109, 128, 130, 133

[56] References Cited

U.S. PATENT DOCUMENTS

| | | | |
|---|---|---|---|
| 3,226,913 | 1/1966 | Avery | 95/103 X |
| 3,498,025 | 3/1970 | Bodnarski | 96/130 X |
| 4,331,455 | 5/1982 | Sato | 55/21 |
| 4,349,357 | 9/1982 | Russell | 96/128 X |
| 4,386,945 | 6/1983 | Gardner | 55/26 |
| 4,552,571 | 11/1985 | Dechene | 55/21 |
| 4,573,616 | 3/1986 | Mottram et al. | 95/96 |
| 4,636,226 | 1/1987 | Canfora | 96/130 X |
| 4,673,415 | 6/1987 | Stanford | 55/21 |
| 4,822,384 | 4/1989 | Kato et al. | 96/130 X |
| 4,869,733 | 9/1989 | Stanford | 55/21 |
| 4,925,464 | 5/1990 | Rabenau et al. | 55/179 |
| 5,071,453 | 12/1991 | Hradek et al. | 55/21 |
| 5,114,441 | 5/1992 | Kanner et al. | 55/26 |
| 5,137,549 | 8/1992 | Stanford et al. | 95/130 X |
| 5,248,320 | 9/1993 | Garrett et al. | 95/96 |

Primary Examiner—Robert Spitzer

[57] ABSTRACT

A pressure swing adsorber system includes a pneumatically driven booster compressor to increase the pressure of the output product gas. A pair of inlet valves controls feed air flow to the sieve beds and the drive cylinder of the booster compressor and are cycled so that one valve opens to pressurize one sieve bed before the other valve closes to allow the other sieve bed vent to atmosphere. During the time that both valves are open, the pressure in the two sieve beds and on opposite sides of the drive cylinder equalize and a portion of the gas in the pressurized sieve bed and drive cylinder side is captured rather than being vented to ambient. System efficiency is increased by selecting whether captured gas from the last pressurized sieve bed or drive cylinder side reaches the next to be pressurized sieve bed first.

4 Claims, 2 Drawing Sheets

ENERGY RECOVERING PRESSURE BALANCE SCHEME FOR A COMBINATION PRESSURE SWING ABSORBER WITH A BOOST COMPRESSOR

BACKGROUND OF THE INVENTION

This invention relates to a pressure swing adsorption apparatus for generating enriched product gas in which the timing of the valves controlling the flow of gas to the adsorber beds and a boost compressor is chosen to maximize system efficiency.

The use of concentrators of the pressure swing adsorber type to produce an enriched product gas is well known. Pressurized air is cyclically delivered to a plurality of beds of molecular sieve material, and certain components of the air become adsorbed by the sieve while the chosen component passes through. The beds are sequentially vented to atmosphere and purged with product gas to discharge the adsorbed components from the molecular sieve, and in this manner, a continuous flow of enriched product gas can be generated.

In certain situations, the required pressure of the product gas is higher than the output pressure from the adsorber and a pressure booster may be used to increase the pressure of the product gas in order to meet system requirements. Booster compressors themselves are old in the art and may take several forms. Some are electrically driven but in certain situations a pneumatically driven booster provides advantages. The pneumatic booster may be driven in sync with the beds of the pressure swing adsorber and such a system is shown in the U.S. Pat. No. to Hradek, 5,071,453 assigned to the assignee of the instant invention. The pressure swing adsorber and booster combination may be used in an aircraft environment where space and weight restrictions are always a factor. The instant invention maximizes system efficiency and thus minimizes weight and space requirements for the system by timing the valves which control the flow of gasses to the sieve beds and the booster to recover energy from the system which is otherwise wasted by being vented to atmosphere.

SUMMARY AND OBJECTS OF THE INVENTION

According to the invention, a booster compressor is used to increase the pressure of product gas from a concentrator in order to satisfy ultimate use requirements. The booster comprises a two stage compressor which is pneumatically driven and a pair of three-way solenoid valves which control gas flow to the sieve beds and to opposite sides of the driving piston in the booster. The timing of the three-way valves is set so that both are open for a short period of time allowing the pressure to equalize between the two sieve beds and the two sides of the piston. The pneumatic lines coupling the boost pump to the pressure swing adsorber are also constructed to allow selection of which gas arrives at a sieve bed first. This is important in enhancing the performance of the concentrator by increasing the efficiency of the system.

It is accordingly an object of the invention to provide a gas concentrator with a booster compressor for increasing the pressure of the product gas in which the booster is pneumatically driven by the same valves which control the operation of the concentrator.

It is another object of the invention to provide the combination of a pressure swing adsorber and a booster compressor in which the timing of the valves allows the pressure to equalize between the two sieve beds and the two sides of the driving piston in order to increase system efficiency.

It is still another object of the invention to provide a pressure swing adsorber and a pneumatically driven booster in which the timing of the valves which control the operation of the concentrator and the booster, and the plumbing between the concentrator and the booster are selected to control the timing of the transfer of gasses which are admitted to the sieve beds.

These and other objects of the invention will become apparent from the following detailed description taken in conjunction with the accompanying drawing FIGURES in which reference numerals used on the drawings correspond to those used throughout the description.

DESCRIPTION OF THE PREFERRED EMBODIMENT

Figure 1:
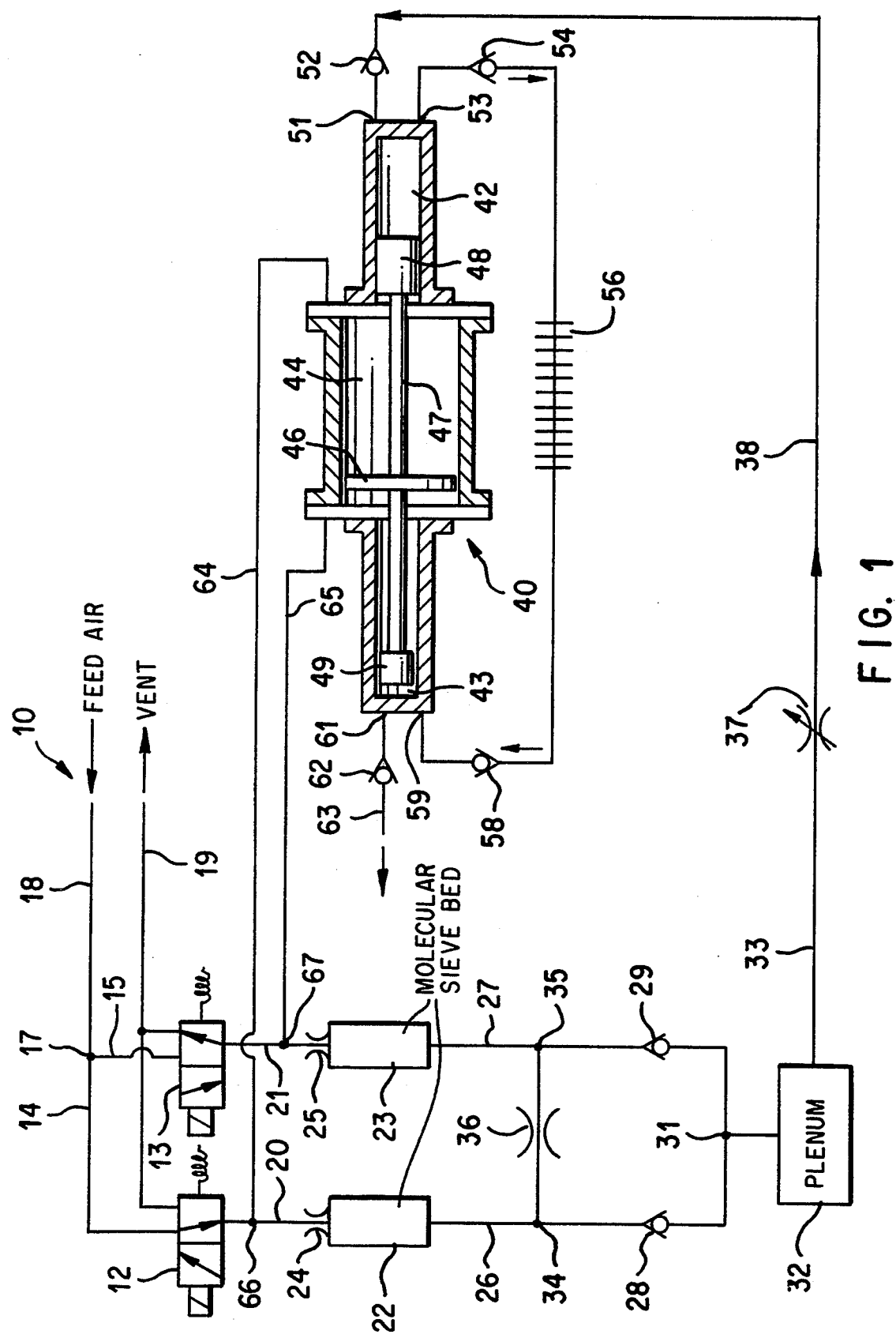
FIG. 1 is a schematic view of a combination pressure swing adsorber and booster compressor.

FIG. 1 shows the combination of a pressure swing adsorber or concentrator and booster compressor generally designated by the reference numeral 10. The concentrator comprises a pair of three-way solenoid valves 12 and 13 which are coupled by inlet lines 14 and 15 respectively to a common node 17. The node 17 is coupled to a feed air inlet 18 which receives air from a compressor (not shown). The outlets of the valves 12 and 13 are coupled to inlet lines 20 and 21, respectively, for the sieve beds 22 and 23. Each sieve bed 22 and 23 has an inlet restriction 24 and 25 located immediately adjacent the inlet to the bed. The outlets 26 and 27 of the sieve beds 22 and 23 are coupled to nodes 34 and 35 which are coupled to check valves 28 and 29 and to one another through a restrictor 36. The outlets of the check valves 28 and 29 are coupled to a node 31 which is coupled to the inlet of a plenum 32. The plenum outlet 33 is coupled through a variable restrictor 37 and a concentrator outlet line 38 to a pressure booster 40.

The pressure booster 40 comprises a first stage compression cylinder 42, a second stage compression cylinder 43 and a driving cylinder 44. A driving piston 46 is positioned in the driving cylinder 44 and reciprocates to either end thereof. The driving piston 46 is connected to a drive shaft 47 having a first stage piston 48 at one end and a second stage piston 49 at the other end. Product gas from the concentrator outlet line 38 is coupled to the inlet 51 of the first stage cylinder 42 through a check valve 52 and the outlet 53 of the first stage cylinder is coupled through a check valve 54 to an intercooler 56. The intercooler is coupled through a second check valve 58 to the inlet 59 of the second stage compression cylinder 43. The outlet 61 of the second stage cylinder 43 is coupled through a check valve 62 to an outlet conduit 63 which is coupled to the point of use (not shown) of the compressed product gas.

Gas which is used to drive the driving piston 46 is supplied to either side of the driving cylinder 44 by the two inlet lines 64 and 65. The inlet lines 64 and 65 are coupled to the outlets of the three-way solenoid valves 12 and 13 at nodes 66 and 67, respectively, and thus receive air from the feed air inlet 18 in a timed sequence which is controlled by the valves 12 and 13.

Figure 2:
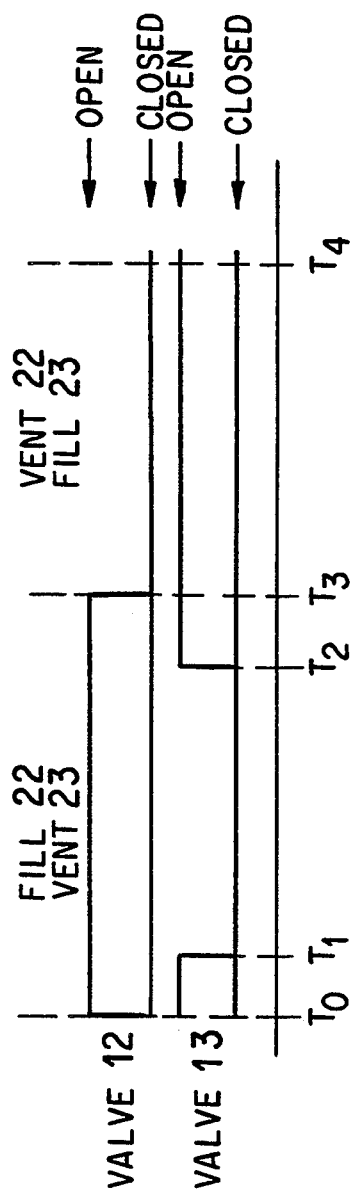
FIG. 2 is a graph showing the timing of the valves used to control the pressure swing adsorber and the booster compressor.

FIG. 2 shows the timing sequence for the two solenoid valves 12 and 13. As shown: at time $T_0$—both valves 12 and 13 are open. As used herein, the term "open", in referring to either of the valves 12 or 13, means that flow is into a bed from the feed air line 18. The term "closed" means that flow is out of the bed and through the vent line 19 to ambient. Thus, as shown in FIG. 1, valve 12 is open and valve 13 is closed. At time $T_1$ valve 13 closes while valve 12 remains open; at time $T_2$—valve 12 remains open and valve 13 opens again; at time $T_3$—valve 12 closes while valve 13 remains open; at time $T_4$—the cycle begins to repeat. Using this valve timing sequence it will be seen that valves 12 and 13 are open during times $T_0$ to $T_1$ and $T_2$ to $T_3$. During time $T_1$ to $T_2$ only valve 12 is open, and during time $T_3$ to $T_4$ only valve 13 is open.

OPERATION OF THE PREFERRED EMBODIMENT

In operation, both valves 12 and 13 are open at time $T_0$. The two sieve beds 22 and 23 are connected together through the inlet lines 20 and 21, the valves 12 and 13, the lines 14 and 15, and the node 17. The fight side of the drive cylinder 44 is coupled to the left side through the lines 64 and 65, the valves 12 and 13, the lines 14 and 15, and the node 17. This allows gas to rush under pressure from the last pressurized bed 23 and the left side of the drive cylinder 44 to the bed 22 and the fight side of the drive cylinder 44 until the pressure in the beds and on the two sides of the drive cylinder 44 equalize.

At time $T_1$ valve 12 remains open and valve 13 is closed; compressed feed air from line 18 flows through the line 14 through the valve 12 and through the inlet 20 to the sieve bed 22 and bed 23 is vented to atmosphere through the valve 13 and the vent line 19. Assuming for purposes of illustration only that the concentrator is functioning as an oxygen concentrator, oxygen will pass through the sieve bed 22 to the outlet 26 while nitrogen and other constituents of air are trapped in the bed. Oxygen from the sieve bed outlet 26 passes through the check valve 28 to the node 31 and into the plenum 32. The plenum acts as an accumulator and smoothes the pressure variations from the concentrator to provide a more even flow on the concentrator outlet line 38. The gas from the plenum outlet 33 passes through the variable restrictor 37 to the concentrator outlet 38. A portion of the oxygen enriched gas from the outlet 26 passes through the restrictor 36 to the node 35 and into the bed 23 to purge the bed of trapped contaminants. The purged containments are vented to atmosphere through the valve 13 and the vent line 19. At the same time air is admitted to the sieve bed 22 it is also admitted to the fight side of the drive cylinder 44 through the inlet line 64. This forces the piston 46 to the left side of the drive cylinder 44 and compresses any gas in the second stage compression cylinder 43. Any air remaining in the left side of the drive cylinder after the pressure equalization is forced through the line 65 and the valve 13 to the vent line 19.

At time $T_2$—the valve 13 opens and valve 12 remains open. Under this condition, the two sieve beds 22 and 23 are connected together through the inlet lines 20 and 21, the valves 12 and 13, the lines 14 and 15 and the node 17. At the same time, the fight side of the drive cylinder 44 is coupled to the left side through the lines 64 and 65, the valves 12 and 13, the lines 14 and 15, and the node 17. This allows the gas to rush under pressure from the bed 22 and the right side of the drive cylinder 44 to the bed 23 and the left side of the drive cylinder 44 until the pressures in the beds and on the two sides of the drive cylinder equalize.

At time $T_3$—equalization is complete, valve 12 closes while the valve 13 remains open and the product gas concentration cycle and pressure boost cycle continue in the normal fashion. That is, the sieve bed 22 and the fight side of the drive cylinder 44 are vented to atmosphere through the vent line 19 while the sieve bed 23 and the left side of the drive cylinder 44 are pressurized by the feed air admitted through the line 18, the node 17, the line 15, the open valve 13, the sieve bed inlet 21 and the drive cylinder inlet 65. At the same time, product gas from the sieve bed outlet 27 flows through the check valve 29 into the plenum 32 while a portion of this gas flows through the restrictor 36 to the node 34 and into the bed 22 to purge the bed 22 of adsorbed contaminants.

According to the invention, coupling the two sieve beds 22 and 23 together through the valves 12 and 13 allows a portion of the energy in the bed which was previously pressurized by the feed air to be recovered rather than being vented to atmosphere. Also, coupling the beds to the pressurized side of the drive cylinder through the valves 12 and 13 allows the energy in the pressurized side to be recovered rather than being vented to atmosphere. As the pressurized side of the drive cylinder is coupled to the low pressure sieve bed through the solenoid valves 12 and 13, the gas in the pressurized side of the drive cylinder rushes into the low pressure sieve bed in preference to the gas from the last pressurized sieve bed. This preference is caused by the two restrictions 24 and 25 located at the entry of the sieve beds 22 and 23. Since gas flowing from the last pressurized sieve bed to the low pressure bed must pass through both restrictions 24 and 25 while gas from the pressurized side of the drive cylinder 44 passes through only one restriction, the flow from the drive cylinder will be in preference to flow from the sieve bed.

The recovery of energy from the sieve bed and the recovery of energy from the booster pump allows the concentrator and pump combination to be smaller while still producing the same quantity of output gas. Moreover, the ability to selectively flow a gas from one portion of the system into the low pressure sieve bed prior to pressurizing the bed with feed air allows the concentrator process to be more efficient thus producing a greater quantity of product gas. Although in the above example the gas flow from the pressurized side of the drive cylinder into the low pressure sieve bed is given preference to flow from the last pressurized bed, this may not always be desired. For example, when using the concentrator to generate nitrogen rather than oxygen or when utilizing sieve material having different characteristics, it may be desirable to fill the low pressure sieve bed with gas from the high pressure bed first rather than from the high pressure side of the boost pump if it is found that the concentrator efficiency is improved by such an arrangement. If this is the case it will be within the skill of one skilled in the art to adjust the size or location of the restrictions in the system or the line sizes coupling the various components together to give preference to one gas over another in order to accomplish the desired result.

Figure 3:
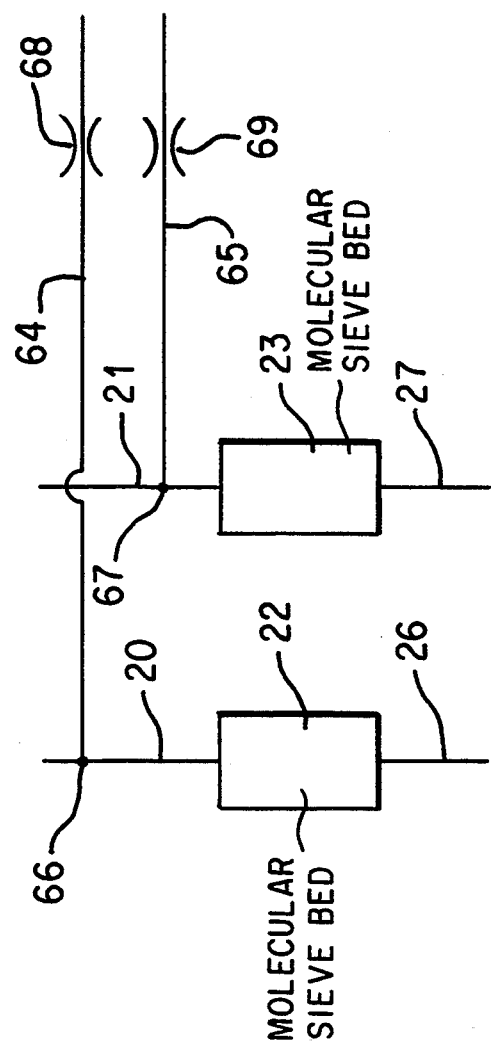
FIG. 3 is a schematic view of an alternative to the FIG. 1 embodiment in which the line restrictions are rearranged to give preference to gas transferred to the low pressure sieve bed from the last pressurized sieve bed.

FIG. 3 shows such an arrangement in which there are no restrictions in the lines 20 and 21 which lead to the beds 22 and 23, and restrictions 68 and 69 have been added to lines 64 and 65 respectively, which couple the nodes 66 and 67 to the boost compressor (not shown). The restrictions 68 and 69 in the lines 64 and 65 give preference to gas transfer to the low pressure sieve bed from the last pressurized sieve bed rather than from the pressurized side of the drive cylinder as in the embodiment shown in FIG. 1. Other portions of the system of FIG. 3 which are not shown are the same as the corresponding portions of FIG. 1.

It would also be within the skill of one skilled in the art to practice the invention using a rotary valve or other valve arrangement rather than the solenoid valves 12 and 13 to perform the required valving operations.

Having thus described the invention, various alterations and modifications will occur to those in the art, which modifications and alterations are intended to be within the scope of the invention as defined in the appended claims.

What is claimed is:

1. A method for maximizing the efficiency of a pressure swing adsorption apparatus and a booster compressor having a drive cylinder in which the compressor is coupled to the output of the pressure swing adsorption apparatus to increase the pressure of the output product gas comprising the steps of:
    cycling a pair of valves to control the flow of feed air to a pair of molecular sieve beds during time interval $T_0$ to $T_4$;
    cycling a pair of valves to control the flow of feed air to a pair of molecular sieve beds during time interval $T_0$ to $T_4$;
    flowing feed air to the first sieve bed during the time interval $T_0$ and $T_1$;
    flowing air to the second sieve bed during time interval $T_3$ and $T_4$;
    flowing air to both sieve beds during time intervals $T_0$ and $T_1$, and $T_2$ and $T_3$; and
    equalizing the pressure between the two sieve beds and the two sides of the drive cylinder during time intervals $T_0$ to $T_1$, and $T_2$ to $T_3$; whereby both valves are open during time intervals $T_0$ to $T_1$, and $T_2$ to $T_3$.

2. A pressure swing adsorption apparatus and a booster compressor for generating and increasing the pressure of enriched product gas comprising:
    a pair of beds of molecular sieve material;
    means for directing feed air to the pair of beds of molecular sieve material;
    means for coupling the outputs of the molecular sieve beds to a booster compressor;
    valve means for controlling the flow of feed air to the molecular sieve beds, said valve means opening and closing according to a predetermined valve cycle to alternately pressurize and exhaust the pair of molecular sieve beds;
    a pneumatic drive cylinder for the booster compressor having opposed sides which are alternately pressurized in order to drive the booster compressor;
    means for coupling a portion of the feed air from the valve means to the opposed sides of the drive cylinder;
    means for equalizing the pressure between the two sieve beds and the opposed sides of the drive cylinder for a short period of time during the valving cycle; and
    means for determining whether gas from the pressurized sieve bed or the pressurized side of the drive cylinder arrives at the exhausted sieve bed first; whereby, the efficiency of the system is increased.

3. The apparatus of claim 2 further comprising:
    a restrictor at the inlet of each sieve bed, whereby gas from the pressurized side of the drive cylinder flows to the exhausted sieve bed in preference to gas from the pressurized sieve bed.

4. The apparatus of claim 2 further comprising:
    a restrictor in each line Coupling feed air from the valve means to the opposed sides of the drive cylinder whereby gas from the pressurized sieve bed flows into the exhausted sieve bed in preference to gas from the pressurized side of the drive cylinder.

* * * * *